US012341621B1

(12) United States Patent
Yu

(10) Patent No.: US 12,341,621 B1
(45) Date of Patent: Jun. 24, 2025

(54) AUDIO CAPTURE DEVICE SELECTION FOR IN-PERSON CONFERENCE PARTICIPANTS

(71) Applicant: Zoom Communications, Inc., San Jose, CA (US)

(72) Inventor: Chi-chian Yu, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/322,360

(22) Filed: May 23, 2023

Related U.S. Application Data

(63) Continuation of application No. 17/588,752, filed on Jan. 31, 2022, now abandoned.

(51) Int. Cl.
| | |
|---|---|
| *H04L 12/18* | (2006.01) |
| *G06F 21/44* | (2013.01) |
| *G10L 15/08* | (2006.01) |
| *G10L 25/60* | (2013.01) |
| *H04W 4/02* | (2018.01) |

(52) U.S. Cl.
CPC .......... *H04L 12/1827* (2013.01); *G06F 21/44* (2013.01); *G10L 15/08* (2013.01); *G10L 25/60* (2013.01); *H04L 12/1818* (2013.01); *H04W 4/025* (2013.01); *G10L 2015/088* (2013.01)

(58) Field of Classification Search
CPC ..... G10L 25/60; G10L 21/0364; G10L 25/69; G10L 21/0232; H04M 3/2236; H04W 72/542; H04L 65/80; H04L 12/1827
See application file for complete search history.

(56) References Cited

U.S. PATENT DOCUMENTS

| | | | |
|---|---|---|---|
| 7,512,883 B2 | 3/2009 | Wallick et al. | |
| 8,467,321 B1* | 6/2013 | Groenjes | H04L 12/1827 370/352 |
| 9,154,730 B2 | 10/2015 | Lee et al. | |
| 9,179,098 B2 | 11/2015 | Buckler | |
| 10,572,859 B1* | 2/2020 | Evans | H04M 3/42068 |
| 10,573,312 B1* | 2/2020 | Thomson | G10L 15/22 |
| 10,897,599 B1* | 1/2021 | Fardig | H04N 7/147 |
| 11,289,089 B1* | 3/2022 | Singh | H04N 9/3179 |
| 2004/0254982 A1 | 12/2004 | Hoffman et al. | |

(Continued)

FOREIGN PATENT DOCUMENTS

JP 4411959 B2 2/2010

*Primary Examiner* — Mahran Y Abu Roumi
(74) *Attorney, Agent, or Firm* — Young Basile Hanlon & MacFarlane, P.C.

(57) ABSTRACT

A conference room device located in a conference room uses a conference room microphone to capture audio for one or more in-person conference participants located in the conference room during a conference. During the conference, audio is sampled from the microphone used by the conference room device and from microphones of one or more user devices determined to be located in the conference room. Based on a score calculated for the audio sampled from a user device being higher than a score calculated for audio sampled from the conference room device, the microphone of the user device is selected for audio capture for one or more of the in-person conference participants. The audio is output through conferencing software to which the conference room device is connected via a user interface tile for the conference room without displaying a new user interface tile.

20 Claims, 8 Drawing Sheets

(56) References Cited

U.S. PATENT DOCUMENTS

| | | | |
|---|---|---|---|
| 2005/0002535 A1 | 1/2005 | Liu et al. | |
| 2007/0064925 A1* | 3/2007 | Suzuki | H04R 3/02 |
| | | | 379/420.01 |
| 2008/0052072 A1 | 2/2008 | Chaudhari et al. | |
| 2014/0123030 A1* | 5/2014 | Kozloski | G06Q 10/10 |
| | | | 715/753 |
| 2015/0172879 A1* | 6/2015 | Vaidya | H04W 4/60 |
| | | | 455/466 |
| 2018/0174597 A1* | 6/2018 | Lee | H04R 29/005 |
| 2019/0164563 A1* | 5/2019 | Volcker | G10L 25/60 |
| 2020/0099792 A1* | 3/2020 | Nguyen | H04W 4/08 |
| 2020/0243094 A1* | 7/2020 | Thomson | G10L 15/28 |
| 2020/0310742 A1* | 10/2020 | Cohen | G10L 21/034 |
| 2020/0344545 A1* | 10/2020 | Hvidsten | G06F 3/165 |
| 2021/0409547 A1* | 12/2021 | Channapragada | H04L 12/1822 |
| 2022/0270628 A1* | 8/2022 | Ghosh | G10L 21/02 |
| 2024/0021208 A1* | 1/2024 | Malenovsky | G10L 19/22 |

\* cited by examiner

US 12,341,621 B1

AUDIO CAPTURE DEVICE SELECTION FOR IN-PERSON CONFERENCE PARTICIPANTS

CROSS-REFERENCE TO RELATED APPLICATION(S)

This application is a continuation of U.S. patent application Ser. No. 17/588,752, filed Jan. 31, 2022, the entire disclosure of which is hereby incorporated by reference.

FIELD

This disclosure relates to audio capture device selection in a conference, such as when one or more users in a conference room have one or more associated user devices.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
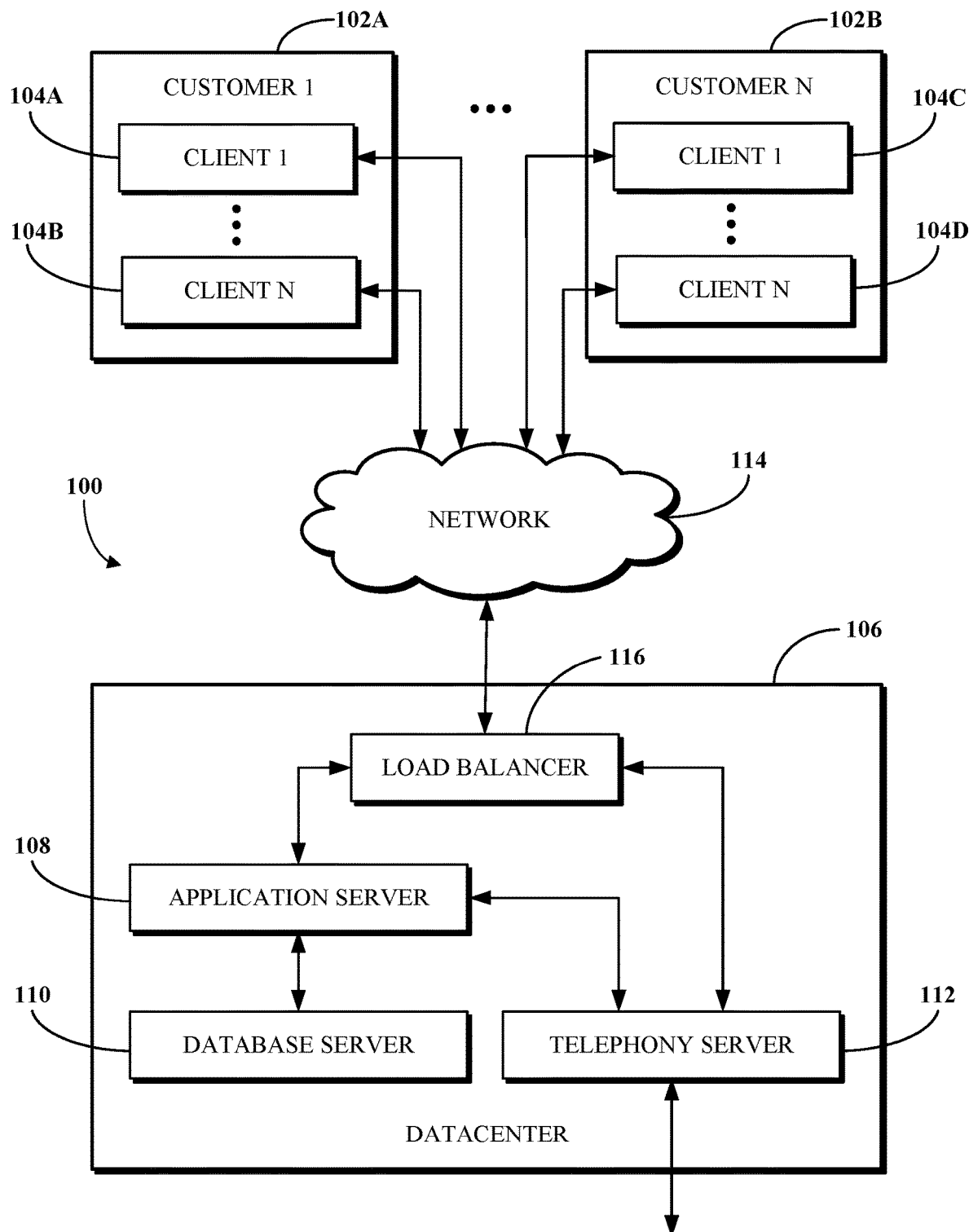
FIG. 1 is a block diagram of an example of an electronic computing and communications system.

Conferencing software, such as of a software platform (e.g., a unified communications as a service (UCaas) platform), is often used to facilitate real-time communications between user devices at different locations. The conferencing software enables user devices to join and participate in a conference in-person (e.g., from a conference room with one or more other participants) or remotely (e.g., from a location that is on-premises and not within the conference room, or from a location that is at a different geographical location than the conference room).

Typically, a conference room within which in-person conference participants are located includes a device which connects to the conferencing software that implements a conference. The device in many cases includes or otherwise uses a single audio capture device, for example, an in-room microphone or microphone array to capture conference audio for all of the in-person conference participants regardless of their locations within the conference room. When an audio signal captured within the conference room is weak, or if there is some interference that negatively affects the audio quality thereof, it affects the overall quality of the conference, especially for remote participants who cannot hear the in-person participants well.

In particular, conventional conferencing systems are not designed to improve audio quality for in-person participants. For example, in large conference rooms, a typical device connected to conferencing software is unable to adequately detect audio from participants that may be seated at a substantial distance from the in-room microphone or otherwise adjust the audio for such participants to improve the quality thereof for others. In particular, software solutions available for improving audio capture, such as by adjusting gain values of the microphone or microphone array used by the device in the conference room, may be ineffective to improve the audio quality for the in-person conference participants. While there may in some cases be other devices with their own microphones present within the conference room, conventional conferencing systems do not leverage them or their microphones.

Implementations of this disclosure address problems such as these by leveraging one or more user devices within a conference room to capture audio of one or more in-person conference participants within the conference room for output to conferencing software. For example, a conference system may include a conference room device that configures a microphone of a user device for audio capture during a conference within a conference room associated with the conference room device. The conference room device may be configured to run a client application that connects to conferencing software (e.g., at a server) to allow all of the participants physically present within the conference room to participate in the conference with one or more remote participants connecting on their own remote devices from remote locations. In many cases, one or more of those in-person participants may have with them a user device in the conference room during the conference. The system, such as via the client application running at the conference room device or otherwise, determines that the user device is within the conference room and obtains permission from the user thereof to use the microphone of the user device. The microphone of the user device may thereafter be used to capture audio for one or more of the in-person participants within the conference room. The use of the microphone of the user device by the conference room device in such a case refers to the audio captured at the user device being output to connected devices using the conferencing software as the audio for the conference room (e.g., in connection with a UI tile of the conferencing software associated with the conference room). Alternatively, the audio captured using the microphone of the user device can be combined with audio captured using one or more other microphones to form a combined audio signal that is then output to the connected devices using the conferencing software. The implementations described herein may require authorization of an account administrator prior to use.

To describe some implementations in greater detail, reference is first made to examples of hardware and software structures used to implement audio capture device selection for in-person conference participants. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
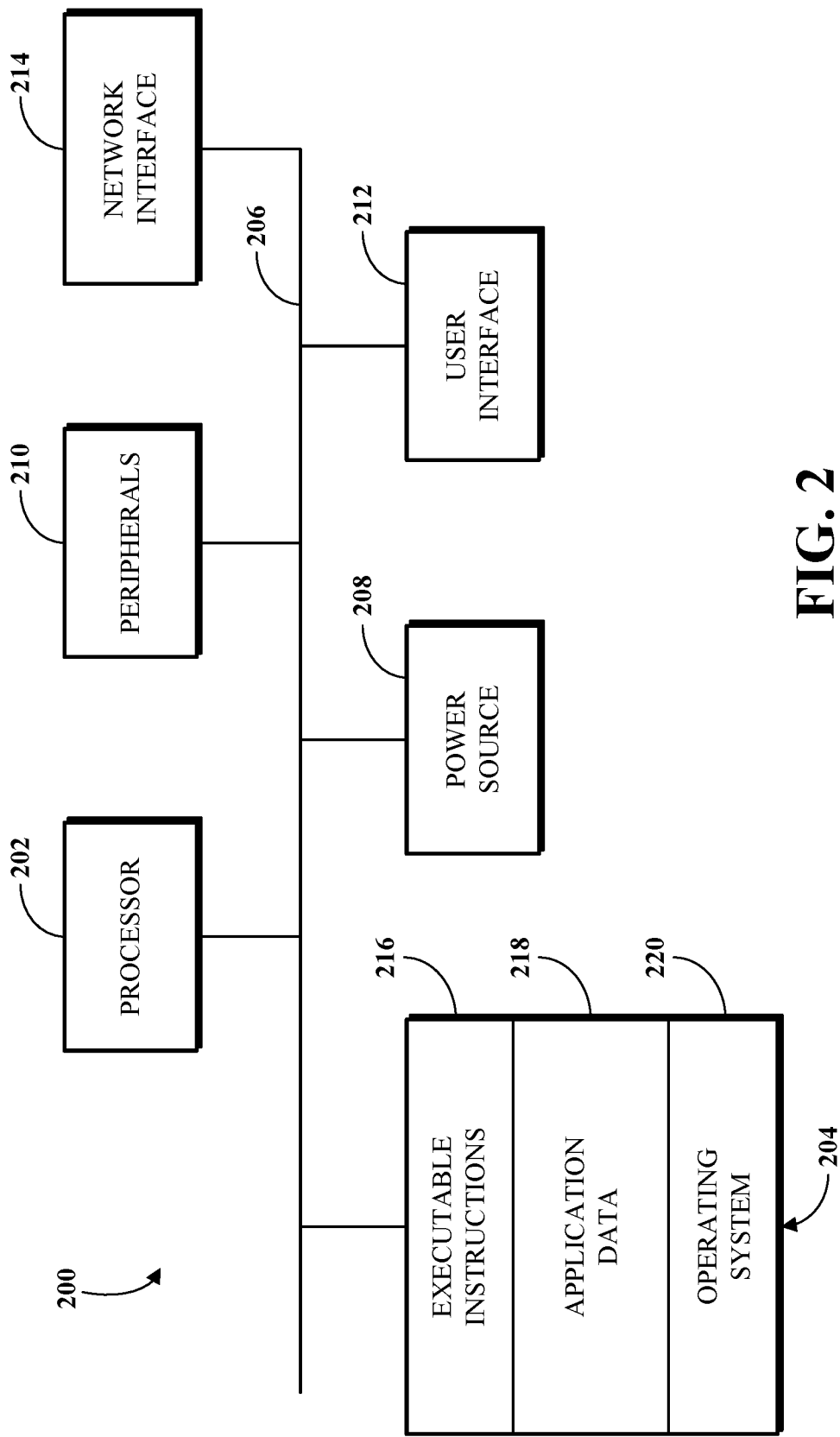
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a UI 212, a network interface 214, other suitable components, or a combination thereof. One or more of the memory 204, the power source 208, the peripherals 210, the UI 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The UI 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
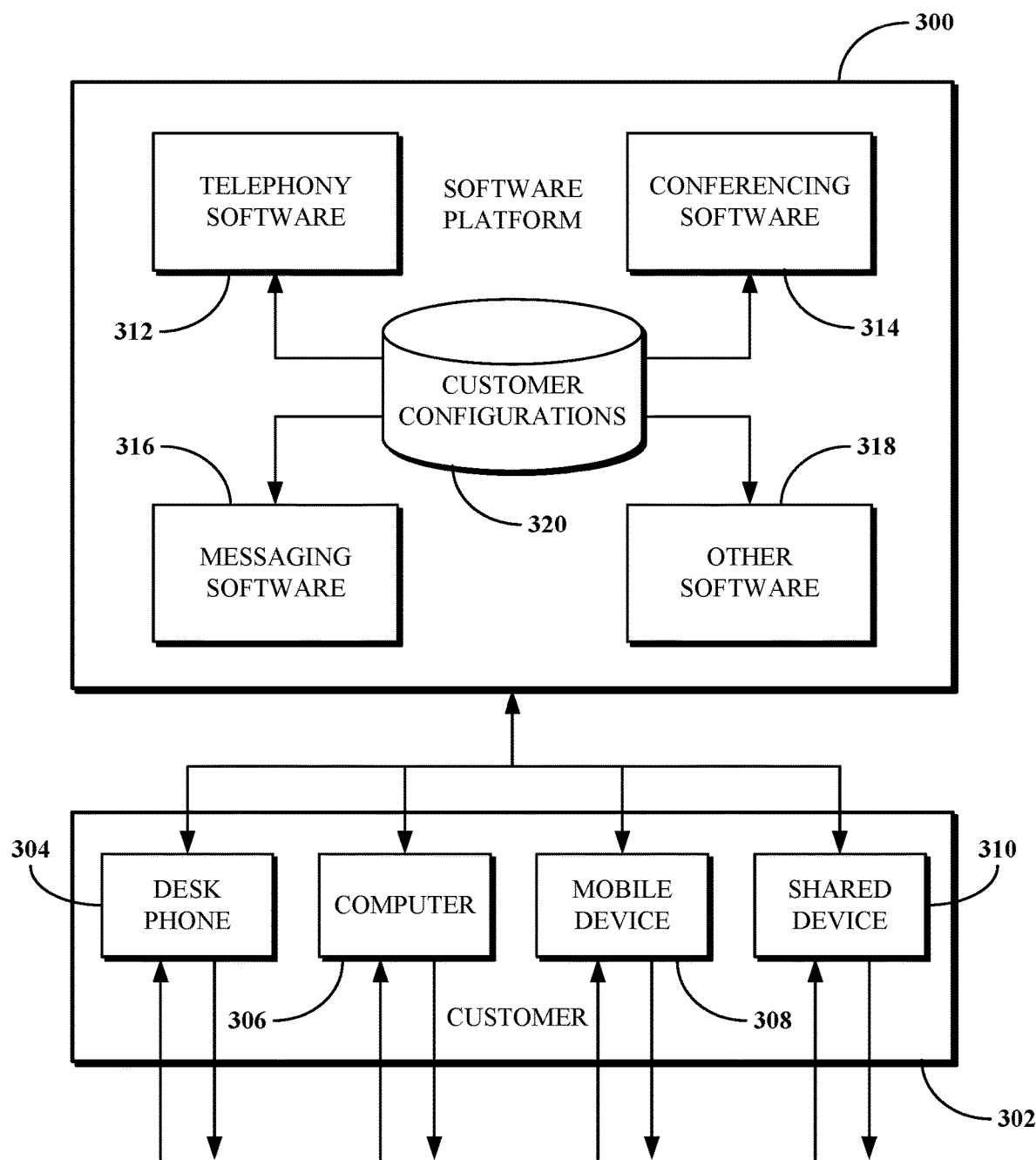
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can enable audio capture device selection for in-person conference participants. In such a case, the other software 318 may optionally be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a UI element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
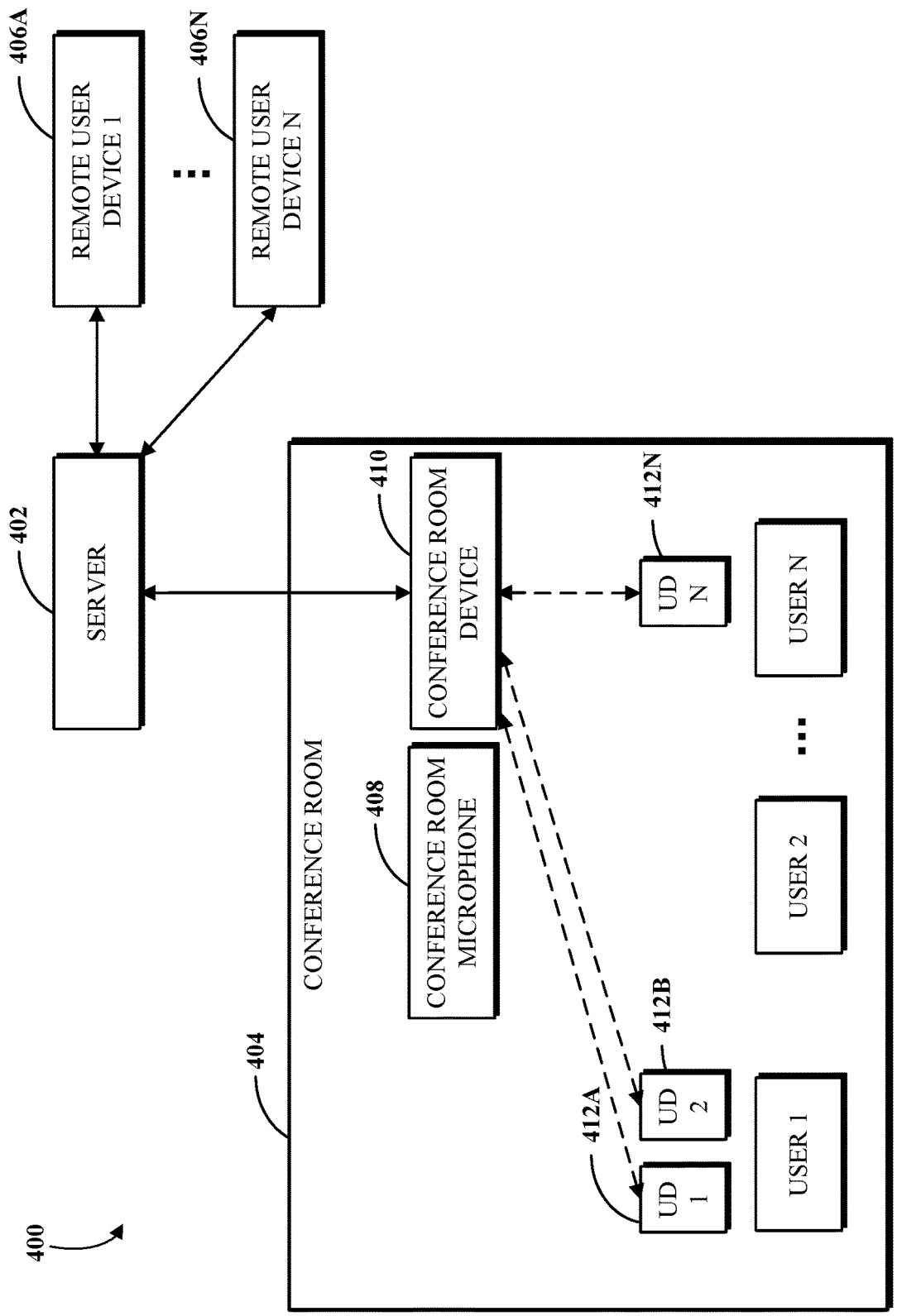
FIG. 4 is a block diagram of an example of a conferencing system.

FIG. 4 is a block diagram of an example of a conferencing system 400. The conferencing system 400 includes a server 402. The server 402 runs conferencing software, for example, the conferencing software 314 shown in FIG. 3. For example, the server 402 may be the application server 108 shown in FIG. 1. As shown, a conference implemented using the server 402 includes in-person participants located within a conference room 404 and remote participants connected via remote user devices 1 406A through N (in which N is an integer greater than or equal to 2) 406N. The conferencing system 400 is configured to detect when an audio signal captured using a conference room microphone 408 located within the conference room 404 is weak and/or negatively affected by some interference. Based on such detection, the conferencing system configures one or more user devices in the conference room 404 to capture audio to improve the audio quality of the conference. The conferencing system 400 is configured to output the audio captured at the user device within the conferencing software running at the server 402 as the audio for the conference room 404.

The server 402 is configured to communicate with the conference room 404 via a conference room device 410. The conference room device 410 is a computing device configured for the conference room 404. The conference room device 410 may generally be a computer such as a laptop or desktop computer located within the conference room 404, and in some cases, may be a mobile device configured for conferencing purposes. In some cases, the conference room device 410 may be located outside of the conference room 404. The conference room device 410 runs a client application that connects to conferencing software running at the server 402 to enable the in-person participants physically present within the conference room 404 to participate in a conference with one or more remote participants connecting on the remote user devices 1 406A through N 406N. The conference room microphone 408 is or includes a microphone or microphone array. The conference room microphone 408 may be integrated within the conference room device. Alternatively, the conference room microphone 408 may be a separate device or other component which is coupled to the conference room device using a wired or wireless connection.

As shown in FIG. 4, three in-person participants, User 1, User 2, and User N are located in the conference room 404. The conference room 404 can contain any number of participants based on the size of the conference room 404, and three participants are simply shown for clarity. Each participant may be associated with one or more user devices. In some cases, a participant may not have an associated user device. In this example, User 1 may be associated with user device 1 (UD1) 412A and user device 2 (UD2) 412B, User 3 may be associated with user device N (UDN) 412N, and User 2 may not be associated with a user device. Associations between user devices and respective participants can be determined, for example, based on user accounts of those participants registered with the conferencing software run on the server 402 or a software platform which implements the conferencing software. For example, information stored in connection with such a user account may identify devices which have been logged into by the subject user. Where such a device is present in the conference room 404, it may be considered an associated user device.

In an example, the quality of audio captured for User 1 using the conference room microphone 408 may be poor because User 1 is located at a distance from the conference room microphone 408 (e.g., outside a range of the conference room microphone 408 defined for quality audio capture). In this example, the conference room device 410 or the server 402 may determine that the audio quality captured for User 1 is below a threshold by sampling audio signals using the conference room microphone 408. The audio quality captured for one or more of the User 1, User 2, or User N may be determined by calculating a score, for example, a voice quality score (VQS), of the audio captured by the conference room microphone 408. A VQS is a score calculated to represent the perceptible quality of a voice of one or more participants. The VQS may range from a score of 1.0 to 5.0 and may be based on a mean opinion score (MOS) of the audio captured by the conference room microphone 408, where a score of 1.0 represents a scenario where the audio quality makes it impossible to communicate and a score of 5.0 represents a scenario where the audio quality is similar to a face-to-face conversation. In some examples, the VQS may be based on a signal-to-noise ratio (SNR) of the audio captured by the conference room microphone 408. In some examples, the VQS may be based on another VQS of the audio captured by the conference room microphone 408. In some examples, the VQS may be based on any combination of the MOS, SNR, and the other VQS. In an example, the threshold may be a baseline VQS score of 3.5.

At some point in time, either prior to the conference or during the conference, the conference room device 410 or the server 402 may transmit a prompt to a user device associated with an in-person conference participant. The prompt may be a visual notification, and audio notification, a haptic notification, or any combination thereof. The prompt may be a request for permission to access a microphone of the user device, a request for the participant to place the user device on a conference room table, or both. For example, a prompt may be transmitted to the UD N 412N of the User N. In another example, a prompt may be transmitted to one or both of the UD 1 412A or the UD 2 412B of the User 1. The prompt used to request permission to access the microphone of a given user device is based on the conference and may be generally understood to be automatically revoked at an end of the conference. As such, the prompt is not a prompt which may be presented in connection with the download or installation of a software application (e.g., a client application) on the user device, such as to configure the general use of the software application. The automatic revocation of permission to access the microphone of a given user device may be determined based on a scheduled end time for the conference (e.g., according to scheduling/calendar data), a time at which the conference is actually ended using the conferencing software, or upon some duration of time (e.g., five minutes) passing without audio being captured after audio capture has occurred for the conference. The revocation of permission to access the microphone of a given user device may be subject to a user prompt, for example, the user may be requested to click a button if the conference is ongoing, in which case if the conference is still ongoing based on a user input, an expiration of the duration of time will not close the conference.

When permission to access the microphone of a given user device is received, the conference room device 410 or the server 402 may sample audio using the microphone of the user device. The conference room device 410 or the server 402 is configured to determine a VQS for the audio sampled using the microphone of the user device. This process is performed for each user device for which permission to access the microphone is granted by the user thereof.

The conference room device 410 or the server 402 are configured to determine whether the VQS of the audio from a given user device located within the conference room 404 is greater than the VQS of the audio from the conference room microphone 408. Based on a determination that the VQS of the audio from a user device is greater than the VQS of the audio from the conference room microphone 408, the conference room device 410 or the server 402 causes the microphone of the user device to capture audio for output to the conference. In some implementations, the conference room device 410 or the server 402 may sample audio using the microphones of some or all of the user devices located within the conference room 404 for individual in-person participants, for example, based on those participants being more than a threshold distance away from the conference room microphone 408. In some implementations, the conference room device 410 or the server 402 may sample audio using the microphones of some or all the user devices located within the conference room 404 for all of the in-person participants. The sampling of the audio using the microphones of the user devices may be performed sequentially by user device or for all user devices substantially simultaneously. The amount of audio sampled from a given user device may vary.

In conventional conferencing software implementations, a different UI tile is added to the conferencing software UI for each device from which media of the conference is received. By way of contrast, in the implementations disclosed herein, the in-person participants may be displayed in a conferencing software UI as a single UI tile for the conference room 404. As such, the use of a microphone other than the conference room microphone 408 will not cause a new UI tile to be displayed for the conference room 404, rather the audio captured using the other microphone is associated with the existing conference room UI tile.

In many cases, one or more of the in-person participants may have with them one or more user devices in the conference room 404 during the conference that is idle. The conference room device 410 or the server 402 configures a microphone of one or more of the user devices within the conference room 404 to capture audio for one or more of the in-person participants within the conference room.

In an example use case, User 1 may be located at a distance outside the range of the conference room microphone 408. As shown in FIG. 4, User 1 has two associated user devices, UD1 412A and UD2 412B. In this example, the conference room device 410 or the server 402 may determine that the audio quality captured for User 1 is below a threshold by sampling audio signals using the conference room microphone 408 and determining a VQS for the audio.

At some point in time, either prior to the conference or during the conference, the User 1 may authorize the conference room device 410 to access a microphone of the UD1 412A, the UD2 412B, or both. The conference room device 410 or the server 402 may sample audio using the conference room microphone 408 and the microphone of the UD1 412A, the UD2 412B, or both. The conference room device 410 or the server 402 are configured to determine a VQS for the audio from User 1 based on the sampled audio from the microphone of the UD1 412A, the microphone of the UD2 412B, or both.

The conference room device 410 or the server 402 are configured to determine whether the VQS of the audio from the UD1 412A, the VQS of the audio from the UD2 412B, or both, are greater than the VQS of the conference room microphone 408. In this example, the conference room device 410 or the server 402 may determine that the audio from the UD2 412B has the highest VQS. Based on a determination that the VQS of the audio from the UD2 412B is greater than the VQS of the audio from the conference room microphone 408, the conference room device 410 or the server 402 are configured to capture audio for User 1 using the microphone of the UD2 412B for output to the conference software without adding a UI tile to the conference UI.

In another example use case, the audio quality captured for User 2, who as shown does not have an associated user device, as captured using the conference room microphone 408 may be poor, for example, because User 2 is sitting outside of a preferred range of the conference room microphone 408 or because User 2 is speaking at a low volume. In this example, the conference room device 410 or the server 402 may determine that the audio quality captured for User 2 is below a threshold by sampling audio signals using the conference room microphone 408 and determining a VQS for the audio.

The conference room device 410 or the server 402 may sample audio using the conference room microphone 408 and the microphone of any user devices for which permission to access the microphone thereof has been granted. Optionally, the conference room device 410 or the server 402 may determine that the User 2 does not have an associated device.

In this example use case, the conference room device 410 or the server 402 may sample audio from User 2 using the microphone of the UD1 412A, the microphone of the UD2 412B, and the microphone of the UDN 412N. The conference room device 410 or the server 402 are configured to determine a VQS for the audio from User 2 based on the sampled audio from the microphone of the UD1 412A, the microphone of the UD2 412B, and the microphone of the UDN 412N.

The conference room device 410 or the server 402 are configured to determine whether the VQS of the audio from the UD1 412A, the VQS of the audio from the UD2 412B, or the VQS of the audio from the UDN 412N, are greater than the VQS of the conference room microphone 408. In this example, the conference room device 410 or the server 402 may determine that the audio from the UDN 412N has the highest VQS. Based on a determination that the VQS of the audio from the UDN 412N is greater than the VQS of the audio from the conference room microphone 408, the conference room device 410 or the server 402 are configured to capture audio of User 2 using the microphone of the UDN 412N for output to the conference without adding a UI tile to the conference UI.

Alternatively, the conference room device 410 or the server 402 may determine that the VQS of the audio from the UD2 412B and the VQS of the audio from the UDN 412N are greater than the VQS of the audio from the conference room microphone 408. Based on the determination that the VQS of the audio from the UD2 412B and the VQS of the audio from the UDN 412N are greater than the VQS of the audio from the conference room microphone 408, the conference room device 410 or the server 402 are configured to use the microphone of the UD2 412B and the microphone of the UDN 412N, to capture audio of User 2, and combine the audio signals from the microphone of the UD2 412B and the microphone of the UDN 412N for output to the conference without adding a UI tile to the conference UI.

As has been described, the processing herein including to prompt user devices for microphone access permission, sampling audio of user devices, determining VQSs for audio sampled from user devices, and selecting audio capture devices based on the VQSs may be performed wholly by the conference room device, wholly by the server 402, or partially by the conference room device and partially by the server 402. Where the processing is performed wholly by the conference room device 410, a connection between the conference room device 410 and the UD1 412A, the UD2 412B, and the UDN 412N may be established upon receiving permission from the respective user devices to access the microphones of the respective user devices. Once the connection between the conference room device 410 and the respective user device is established, audio may be captured from the microphone of the respective user device and transmitted to the conference room device 410. The conference room device 410 is configured to output the audio captured using the microphone of the respective user device to the conference. Where the processing is performed wholly by the server 402, a connection between the server 402 and the UD1 412A, the UD2 412B, and the UDN 412N may be established upon receiving permission from the respective user devices to access the microphones of the respective user devices. Once the connection between the respective user device and the server 402 is established, the respective user device captures audio using its microphone and transmits the audio to the server 402. The server 402 is configured to output the audio captured using the microphone of the respective user device to the conference. Where the processing is performed partially by each of the conference room device and the server 402, a connection between the conference room device 410 and the UD1 412A, the UD2, 412B, and the UDN 412N may be established upon receiving permission from the respective user devices to access the microphones of the respective user devices. Once the connection between the conference room device 410 and the respective user device is established, audio may be captured from the microphone of the respective user device and transmitted to the conference room device 410. The conference room device 410 transmits the audio captured using the microphone of the respective user device to the server 402.

The server 402 outputs the audio captured using the microphone of the respective user device to the conference.

Although the above discussion is generally related to participants within a conference room, the conferencing system 400 of FIG. 4 can be used in other situations. For example, the conferencing system 400 can be used in academic settings to support audio capture for teachers and/or students within a classroom, such as to improve audio quality of the captured audio for other teachers, students, or guests virtually connected to a class session over the conferencing software. In another example, the conferencing system 400 can be used in a non-conference room office setting where there are multiple participants in one or more of those rooms. In yet another example, the conferencing system 400 can be used for expos, webinars, and other event presentations with virtual components in which audience audio capture is important.

Figure 5:
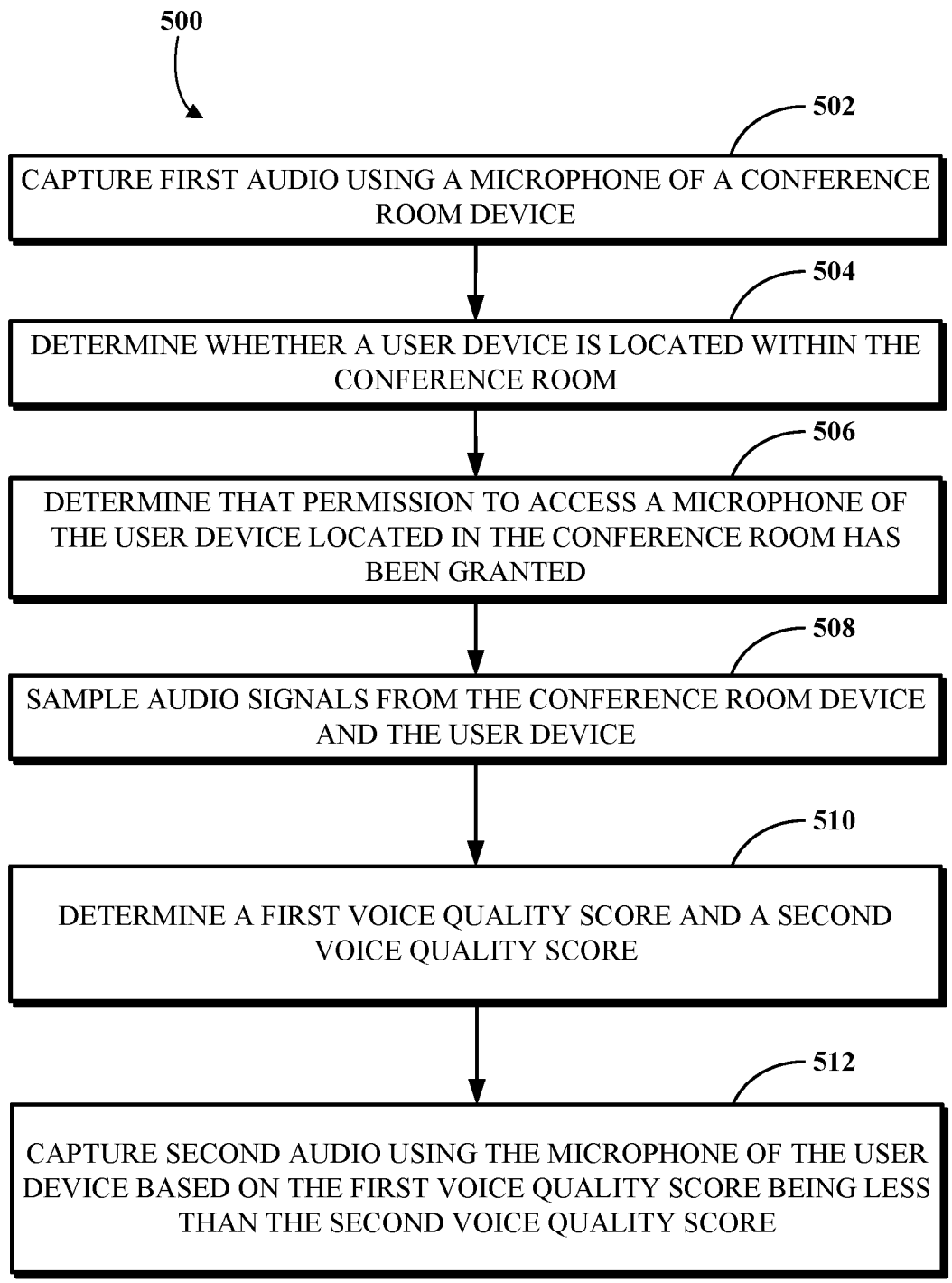
FIG. 5 is a flow diagram of an example of a method for audio capture device selection for in-person conference participants.
Figure 6:
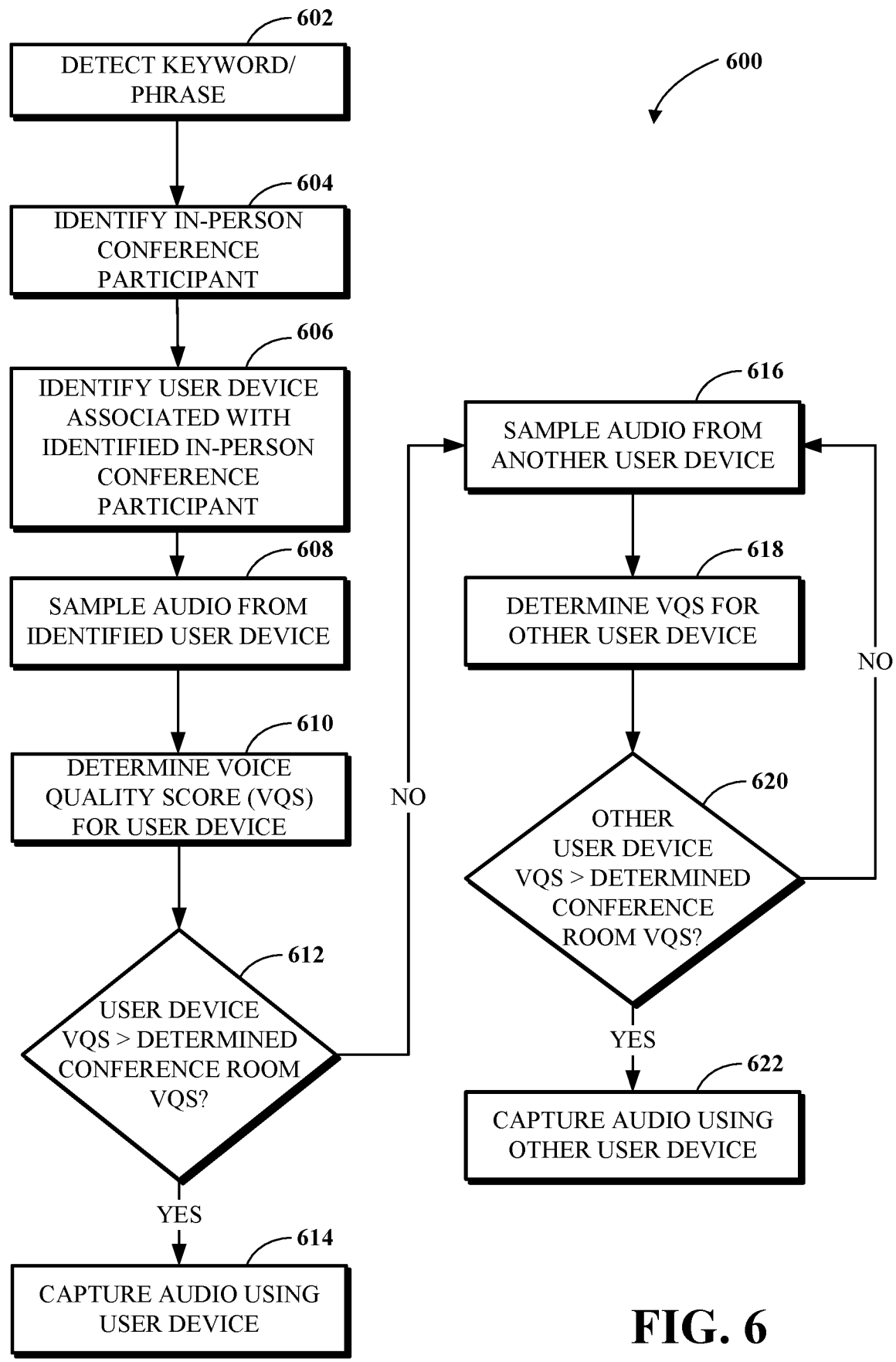
FIG. 6 is a flow diagram of an example of a method for keyword or phrase detection for in-person conference audio capture device selection.
Figure 7:
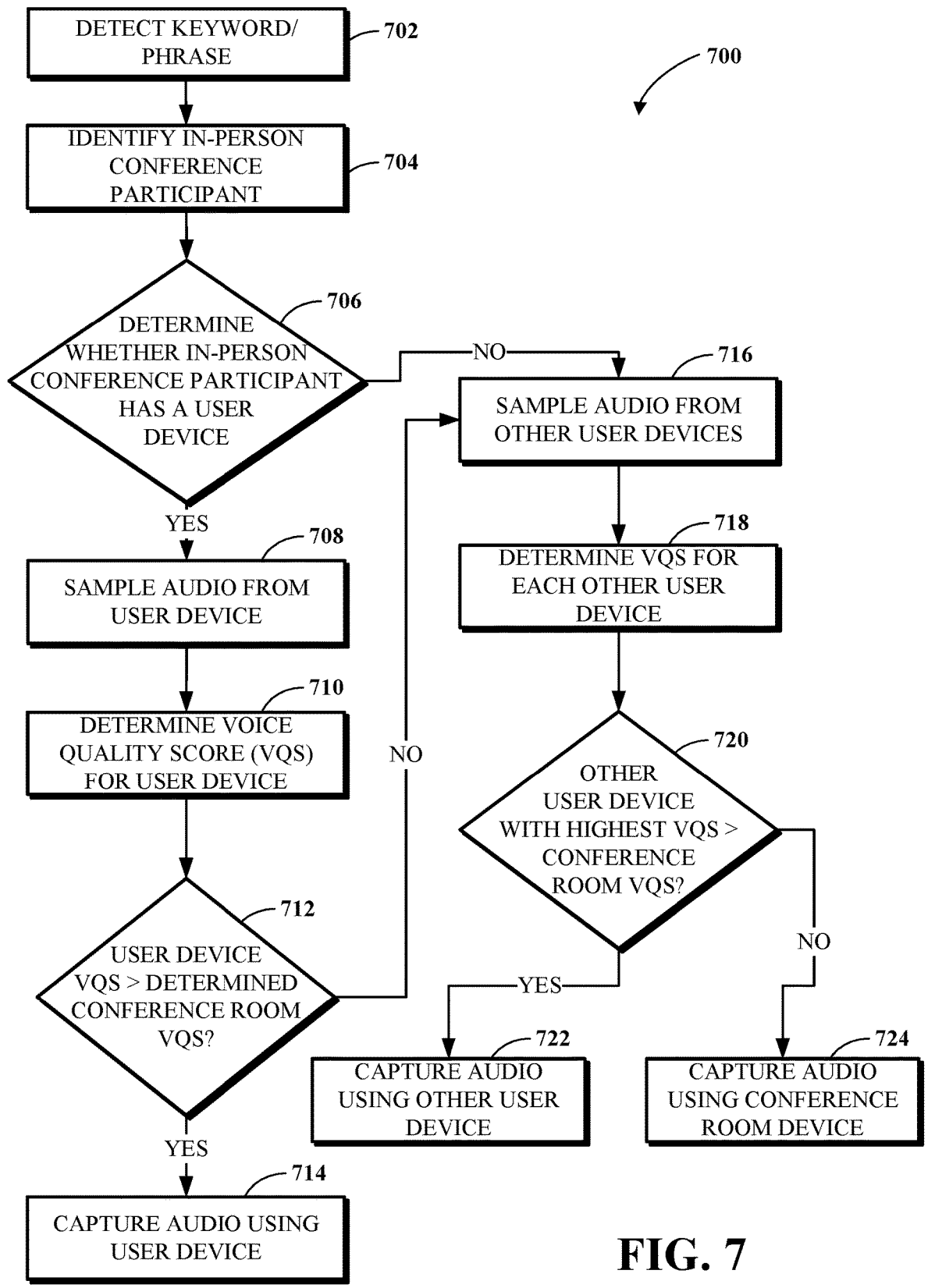
FIG. 7 is a flow diagram of another example of a method for keyword or phrase detection for in-person conference audio capture device selection.

To further describe some implementations in greater detail, reference is next made to examples of methods that may be performed by or using a system for audio capture device selection in a conference for improved audio quality. FIGS. 5-7 are flowcharts of examples of methods for audio capture device selection for in-person conference participants. The methods 500, 600, and 700 can be executed using computing devices, such as the systems, hardware, and software described with respect to FIGS. 1-4. The methods 500, 600, and 700 can be performed, for example, by executing a machine-readable program or other computer-executable instructions, such as routines, instructions, programs, or other code. The steps, or operations, of the methods 500, 600, 700, or another technique, method, process, or algorithm described in connection with the implementations disclosed herein can be implemented directly in hardware, firmware, software executed by hardware, circuitry, or a combination thereof.

For simplicity of explanation, the methods 500, 600, and 700 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 5 is a flow diagram of an example of a method 500 for audio capture device selection in a conference. At 502, the method 500 includes capturing first audio during a conference using a microphone of a conference room device located within a conference room. The first audio is audio from one or more in-person participants within the conference room that is captured by the conference room microphone. The first audio captured by the conference room microphone is output to the conference such that remote participants can listen to the audio component of the conference using their respective remote user devices.

At 504, the method 500 includes determining whether a user device is located within the conference room. The determination that the user device is located within the conference room may be based on a number of factors including calendar information, location information (e.g., geolocation data) from the user device, detection of movement of the user device, ultrasound signal detection, or any combination thereof. The calendar information may be stored in a calendar database for storing calendar information of users of the conferencing system. The calendar information may include an invite that indicates when a user is scheduled to attend a conference in person in a conference room including start and/or end times of the conference, a location of the conference (i.e., the conference room), an invite status (i.e., an indication of whether the user has accepted the invite), or any combination thereof. At the start time of the conference, or at a predetermined time prior to the start of the conference, the conferencing system may query the calendar database to obtain the calendar information of the in-person participants of the conference. Based on the invite status, the conferencing system may determine that the user device is located within the conference room. For example, when the invite status indicates that the invite was accepted by the user, the conferencing system determines that the user device is located within the conference room at or near the start time of the conference.

The location information may include geolocation data that is obtained from a sensor of the user device, such as a GPS sensor. The location information may show that the user is at the premises of the conference room location or in the conference room at or near the conference start time. The location information may be determined based on a beacon or some other radio signal that is transmitted by a conference room device. In an example, the user device may receive the beacon or other radio signal from the conference room device and transmit a message to the server that the beacon was received. The server may determine that the user device is located within the conference room based on the reception of the message. In an example, the calendar information, either alone or in conjunction with the location information, may be used to determine that the user device is located within the conference room. In an example where the calendar information is used in conjunction with the location information, the conferencing system may determine that the user device is located within the conference room based on a determination that the invite status indicates that the invite was accepted and that the location information indicates that the user device is near the conference room at the start time of the conference.

The determination that the user device is located within the conference room may be based on a determination that the user device has moved within a predetermined time of a start time of the conference. The conferencing system may detect that the user device has moved by obtaining sensor information, such as accelerometer/gyroscope information, from the user device. In an example, the user device may transmit a message to the server indicating movement of the device based on the sensor information when the calendar information indicates that the invite for the conference was accepted. The determination that the user device is located within the conference room may also be based on the user device connecting to the conference (e.g., via a client on the user device).

The determination that the user device is located within the conference room may be based on a detection of an ultrasound signal transmitted by a conference room device. The user device may detect the ultrasound signal and transmit a message to the conference room device indicating that the user device detected the ultrasound signal. The conference room device may determine that the user device is present within the conference room based on the message. The conference room device may transmit a message to the server to notify the server that the user device is present within the conference room.

At 506, the method 500 includes determining that permission to access a microphone of a user device located in the conference room for the conference has been granted. The determination that permission to access the microphone of the user device located in the conference room has been granted can occur before or after the capturing of the first audio at 502.

In some examples, the method 500 may include transmitting a prompt to the user device at the start of the conference or during the conference based on a determination that the user device is located within the conference room. The prompt may be a visual notification, an audible notification, a haptic notification, or any combination thereof. The prompt may indicate that the audio of the conference may be improved if the user places their user device (e.g., mobile phone, tablet, or laptop) on a table within the conference room. The prompt may include a request for permission for the conference system to access the microphone of the user device to be used by the conference system to capture audio for output to the conference. When the conference system receives permission from the user device, the conference system opens an audio channel between a server of the conference system and the user device. In some examples, the conference system may open an audio channel between the conference room device and the user device. The prompt may be transmitted to the user device responsive to the determination that the user device is located within the conference room (e.g., based on one or more of the factors described above). Alternatively, the prompt may be transmitted to the user device at some time after the determination is made that the user device is located within the conference room. For example, the prompt may be transmitted to the user device responsive to a VQS for audio captured using a conference room microphone being below a threshold. The determination that permission to access the microphone of the user device has been granted is based on receiving a message from the user device in response to the request. The message may indicate that access to the microphone of the user device has been granted. If access to the microphone of the user device is not granted, permission from other user devices may be requested or the conference may continue using the audio captured using the conference room microphone.

At 508, the method 500 includes sampling audio signals from the microphone used by the conference room device and the microphone of the user device. The audio signals from the microphone of the conference room device, the microphone of the user device, or both, may be sampled periodically or based on a triggering event, such as detecting a keyword or phrase using speech detection. For example, if a keyword or phrase such as "Todd, I cannot hear you," or "Can you speak up Todd?" is detected, it may be determined that the audio capture device (e.g., the conference room device) currently used to capture audio from the conference participant named Todd may need to be switched to another audio capture device (e.g. the user device) that belongs to the conference participant or is within a vicinity of the conference participant such that it provides improved audio performance over the current audio capture device. In another example, the audio signals are sampled periodically to determine whether the quality of the audio from the microphone of the conference room device, the microphone of the user device, or both, is below a threshold. If it is determined that the audio quality from the currently used microphone is below a threshold, the conferencing system may determine that a switch to another microphone is needed.

At 510, the method 500 includes determining a first VQS for the audio from the microphone of the conference room device and a second VQS for the audio from the microphone of the user device. In some examples, the sampling of the audio signals from the conference room device may be triggered when a VQS of the audio from the microphone of the conference device falls below a threshold. The first VQS and the second VQS can be used to determine which microphone is the best microphone to capture audio from, for example, based on an MOS, an SNR, another VQS, or any combination thereof.

At 512, the method 500 includes capturing second audio using the microphone of the user device based on the first VQS of the audio from the microphone of the conference room device being less than the second VQS of the audio from the microphone of the user device. The second audio is audio from one or more in-person participants within the conference room that is captured by the microphone of the user device. The second audio captured by the microphone of the user device is output to the conference such that remote participants can listen to the audio component of the conference using their respective remote user devices. Capturing the second audio using the microphone of the user device may thus be understood to include determining to capture the second audio using the microphone of the user device. In some examples, the capturing of the second audio using the microphone of the user device may be based on a difference between the first VQS and the second VQS being above a threshold. In at least some cases, based on the determination to capture the second audio using the microphone of the user device, a brief training for echo cancellation may be performed prior to actually capturing the second audio using the microphone of the user device.

An echo canceller of the system learns the direction and latency of the echo produced when feedback from the cross chatter from multiple microphones causes an echo and diminishes audio quality. The echo canceller is configured to determine a distance between the user and the microphone of the conference room and a distance between the user and the microphone of the user device. Typically, the distance between the user and the microphone of the conference room is greater than the distance between the user and the microphone of the user device. The echo canceller is configured to determine, based on the learned direction and latency (e.g., caused by the determined distances) of various microphone signals, which of the microphone signal levels can be boosted or suppressed (e.g., by using weights) to cancel out the echo. The echo path (i.e., distance) can change materially when a switch to the microphone of the user device is made, therefore the echo canceller is configured to retrain to reduce echo based on the distance between the microphone of the user device and the user prior to switching to the microphone of the user device.

During the retraining, the audio captured from the microphone of the conference room is output to the conference as the system prepares to transition to capturing the audio from the microphone of the user device. During this transition process, the system is configured to open a channel between the user device and the server, perform the echo cancellation process to cancel out the echo, and switch to capturing audio from the microphone of the user device when a desirable level of echo cancellation is achieved or when the echo is stabilized.

When the second audio is being captured using the microphone of the user device, the audio signals from the user device are transmitted to the server of the conference system or the conference room device via the audio channel opened between the user device and the server or conference room device. The server then transmits the audio captured by the microphone of the user device for output to the conference without adding a UI tile to the conference UI.

In some implementations, audio captured from microphones of multiple user devices may be sampled. The sampling of the audio captured from microphones of multiple user devices may be performed sequentially or substantially simultaneously. For example, if it is determined that the audio quality from the microphone of the conference room device is below a threshold, the conferencing system may sample a microphone for a user device to determine whether the audio quality from the microphone of the user device is greater than the audio quality from the microphone of the conference room device. If it is determined that the audio quality from the microphone of the user device is not greater than the audio quality from the microphone of the conference room device, the conferencing system may sample audio captured from a microphone of another user device and repeat the process until the audio quality from a microphone of a user device is found to be greater than the audio quality from the microphone of the conference room device. Alternatively, the conferencing system may sample audio from the microphones of all the user devices determined to be within the conference room simultaneously or substantially simultaneously.

FIG. 6 is a flow diagram of an example of a method 600 for keyword or phrase detection in a conference for audio capture device selection. In some cases, the method 600 may be implemented in conjunction with the method 500 shown in FIG. 5, for example, at operation 502. At 602, the method 600 includes detecting a keyword or phrase in audio of a conference. A component of the conference includes a conference room that contains one or more users (e.g., in-person conference participants) attending in person and located within the conference room. The audio that is output to the conference may be obtained using one or more microphones of a user device located within the conference room or a microphone of a conference room device. The keyword or phrase may be detected using speech detection.

The keyword or phrase is a word or group of words detected in an audio stream of the conference that indicates that the audio quality for one or more in-person conference participants is low. The conferencing system may perform voice detection to detect whether the audio stream includes speech. If it is determined that the audio stream includes speech, the conferencing system performs a speech-to-text conversion and determines whether the text includes a keyword or phrase by comparing the text to a database that stores keywords and phrases. The conferencing system may process the text using a machine learning (ML) algorithm to determine new keywords and phrases and update the database accordingly. In an example, the keyword or phrase may include an identifier associated with an in-person conference participant and an indication that the audio quality captured for the in-person conference participant is low. For example, in the phrase "Your voice sounds distant, Steve," which may be spoken by a remote conference participant (i.e., someone who is not located in the conference room with Steve), the identifier associated with the in-person conference participant may be the name of the in-person conference participant (i.e., "Steve"), and the indication that the audio quality is low may be the portion of the phrase "Your voice sounds distant."

At 604, the method 600 includes identifying the in-person conference participant. Identifying the in-person conference participant may include parsing the detected phrase to determine an identifier associated with an in-person conference participant. In this example, the in-person conference participant may be identified by detecting the name of the in-person conference participant in the phrase. The identification of the in-person conference participant may be based on a determination of whether the in-person conference participant is located within the conference room. For example, if the identifier associated with the in-person conference participant is "Steve," the conferencing system will search for an in-person conference participant named Steve that is located within the conference room, for example, based on a prior determination of the in-person conference participants. If there are multiple in-person conference participants associated with the identifier located within the conference room, the conferencing system may identify each of these in-person conference participants as a candidate in-person conference participant. In some examples, if there are multiple in-person conference participants associated with the identifier located within the conference room, the conferencing system may sample audio from each user device associated with each of the candidate in-person conference participants that has granted access to the microphones of their respective user devices to identify the in-person conference participant.

At 606, the method 600 includes identifying a user device associated with the identified in-person conference participant. The user device may be identified based on a user account, device location, or both. For example, the user device may be identified by determining that the user device is associated with a user account of a user that is determined to be within the conference room, for example, based on calendar information, location information, and/or device movement information. In some examples, more than one device (e.g., a mobile phone and a laptop) may be identified for a given user.

At 608, the method 600 includes sampling audio using a microphone of the identified user device. The audio may be sampled from the start of the audio capture and for a predetermined time after speech is detected. In some cases, where applicable, multiple microphones of the user device may be used to sample the audio.

At 610, the method 600 includes determining a VQS for the audio from the microphone of the identified user device. In some cases where the identified user device has multiple microphones, a VQS for the audio from each microphone may be determined. A determination may then be made as to which microphone or combination of microphones produces the best audio signal based on their respective VQSs.

At 612, the method 600 includes determining whether the VQS of the audio from the microphone(s) of the user device is greater than a determined VQS of the audio from the microphone of the conference room device. If the VQS of the audio from the microphone(s) of the user device is determined to be greater than the VQS of the audio from the microphone of the conference room device, then the method 600 includes determining to capture audio using a microphone(s) of the user device and capturing audio using the microphone(s) of the user device for output to the conference at 614. If the VQS of the audio from the microphone(s) of the user device is determined to be less than or equal to the VQS of the audio from the microphone of the conference room device, then the method 600 includes sampling audio from another user device that is located within the conference room at 616. In some examples, the sampling of the audio may include sampling audio from all the user devices determined to be located within the conference room simultaneously or substantially simultaneously.

At 618, the method 600 includes determining a VQS for the audio from the other user device. If the other user device has multiple microphones, a VQS for the audio from each microphone may be determined, and a determination may be made as to which microphone or combination of microphones produces the best audio signal based on their respective VQSs. In an example where audio from all the user devices determined to be within the conference room is sampled, a VQS for the audio from each of the user devices is determined.

At 620, the method 600 includes determining whether the VQS of the audio from the other device is greater than the determined VQS of the audio from the conference room device. If the VQS of the audio from the microphone of the other user device is determined to be greater than the VQS of the audio from the microphone of the conference room device, then the method 600 includes capturing audio from the microphone of the other user device for output to the conference at 622. If the VQS of the audio from the microphone of the other user device is determined to be less than or equal to the VQS of the audio from the microphone of the conference room device, then the method 600 may include sampling audio from another user device at 616. Operations 616-620 may be repeated until a suitable user device is found to capture audio for output to the conference. In an example where audio from all the user devices determined to be within the conference room is sampled, if the audio from the microphone of the user device determined to have the highest VQS is greater than the audio from the microphone of the conference room device, then the method 600 includes capturing audio using the microphone of the user device determined to have the highest VQS for output to the conference at 622.

In some examples, it may be determined that capturing audio from the identified user device and the other user device may produce the best audio signal. In these examples, the audio signals from the microphone of the identified user device and the other user device may be combined for output to the conference. In an example, the conference room includes a long table that has a microphone of the conference room at the front of the table. The microphone of the conference room may be a speaker and microphone bar combination. In this example, a first user may be seated at or near the front of the table, and a second user may be seated at a far end of the table. The first user and the second user may be engaged in a discussion during the conference. In order to capture the audio from the second user, it may be best to capture the audio using the microphone of a user device of the second user. In this situation, however, a user device, such as a mobile phone, may not be capable of capturing audio from a user (i.e., the first user) that is at a distance from the user device of the second user. The conferencing system may enter a back-and-forth mode in which one participant's audio capture (e.g., the first user's audio capture) is through the speaker and microphone bar combination and the other participant's audio capture (e.g., the second user's audio capture) is through the user device of the second user. In order to avoid this back-and-forth mode, the conferencing system may determine the echo paths between each user and both microphones. The conferencing system may then capture audio using both microphones by combining the signals from each based on the determined echo paths to reduce echo.

FIG. 7 is a flow diagram of another example of a method 700 for keyword or phrase detection in a conference for audio capture device selection. In some cases, the method 700 may be implemented in conjunction with the method 500 shown in FIG. 5, for example, at operation 502. At 702, the method 700 includes detecting a keyword or phrase in audio of a conference. A component of the conference includes a conference room that contains one or more users (e.g., in-person conference participants) attending in person and located within the conference room. The audio that is output to the conference may be obtained using one or more microphones of a user device located within the conference room or a microphone of a conference room device. The keyword or phrase may be detected using speech detection.

The conferencing system may perform voice detection to detect whether the audio stream includes speech. If it is determined that the audio stream includes speech, the conferencing system performs a speech-to-text conversion and determines whether the text includes a keyword or phrase by comparing the text to a database that stores keywords or phrases. The conferencing system may process the text using an ML algorithm to determine new keywords and phrases and update the database accordingly. In an example, the keyword or phrase may include an identifier associated with an in-person conference participant and an indication that the audio quality captured for the in-person conference participant is low. For example, in the phrase "Mary, we are having trouble hearing you," which may be spoken by a remote conference participant (i.e., someone who is not located in the conference room with Steve), the identifier associated with the in-person conference participant may be the name of the in-person conference participant (i.e., "Mary"), and the indication that the audio quality is low may be the portion of the phrase "trouble hearing you."

At 704, the method 700 includes identifying the in-person conference participant. Identifying the in-person conference participant may include parsing the detected phrase to determine an identifier associated with an in-person conference participant. In this example, the in-person conference participant may be identified by detecting the name of the in-person conference participant in the phrase. The identification of the in-person conference participant may be based on a determination of whether the in-person conference participant is located within the conference room. For example, if the identifier associated with the in-person conference participant is "Mary," the conferencing system will search for an in-person conference participant named Mary that is located within the conference room, for example, based on a prior determination of the in-person conference participants. If there are multiple in-person conference participants associated with the identifier located within the conference room, the conferencing system may identify the each of these in-person conference participants as a candidate in-person conference participant. In some examples, if there are multiple in-person conference participants associated with the identifier located within the conference room, the conferencing system may sample audio from each user device associated with each of the candidate in-person conference participants that has granted access to the microphones of their respective user devices to identify the in-person conference participant.

At 706, the method 700 includes determining whether the in-person conference participant has an associated user device located within the conference room. This determination may be based on an identification of a user account, device location, or both. For example, it may be determined that a user device is associated with a user account of a user that is determined to be within the conference room, for example, based on calendar information, location information, and/or device movement information. In some examples, it may be determined that more than one device (e.g., a mobile phone and a laptop) is identified for a given user and is located within the conference room.

If it is determined at 706 that the identified in-person conference participant has a user device located within the conference room, the method 700 includes sampling audio using a microphone of the identified user device at 708. The audio may be sampled from the start of the audio capture and for a predetermined time after speech is detected. In some cases, where applicable, multiple microphones of the user device may be used to sample the audio.

At 710, the method 700 includes determining a VQS for the audio from the microphone of the identified user device. In some cases where the identified user device has multiple microphones, a VQS for the audio from each microphone may be determined. A determination may then be made as to which microphone or combination of microphones produces the best audio signal based on their respective VQSs.

At 712, the method 700 includes determining whether the VQS of the audio from the microphone of the user device is greater than a determined VQS of the audio from the microphone of the conference room device. If the VQS of the audio from the microphone of the user device is determined to be greater than the VQS of the audio from the microphone of the conference room device, then the method 700 includes determining to capture audio using a microphone of the user device and capturing audio using the microphone of the user device for output to the conference at 714. If the VQS of the audio from the microphone of the user device is determined to be less than or equal to the VQS of the audio from the microphone of the conference room device, then the method 700 includes sampling audio from other user devices that are located within the conference room at 716. The other user devices may be associated with other users that are present in the conference room. In some examples, sampling audio from other user devices that are located within the conference room includes sampling all the user devices that are determined to be located within the conference room.

At 718, the method 700 includes determining a VQS for the audio from the other user devices located within the conference room. Some of the other user devices may have multiple microphones. If the other user device has multiple microphones, a VQS for the audio from each microphone may be determined, and a determination may be made as to which microphone or combination of microphones produces the best audio signal based on their respective VQSs.

At 720, the method 700 includes determining whether the VQS of the audio from the other user device with the highest VQS of the other user devices is greater than the determined VQS of the audio from the conference room device. If the VQS of the audio from the microphone of the other user device with the highest VQS of the other user devices is determined to be greater than the VQS of the audio from the microphone of the conference room device, then the method 700 includes capturing audio from the microphone of the other user device that has the highest VQS of the other devices for output to the conference at 722. If the VQS of the audio from the microphone of the other user device that has the highest VQS of the other user devices is determined to be less than or equal to the VQS of the audio from the microphone of the conference room device, then the method 700 may include capturing audio using a microphone of the conference room device at 724.

In some examples, it may be determined that capturing audio from the identified user device and the other user device may produce the best audio signal. In these examples, the audio signals from the microphone of the identified user device and the other user device may be combined for output to the conference.

If it is determined at 706 that the identified user does not have a user device located within the conference room, the method 700 includes sampling audio using a microphones of other user devices located within the conference room at 716. The method 700 may then continue with operations 718-724 as described above.

In some examples, it may be determined that capturing audio from the microphone of the identified user device and the microphone of the conference room device together may produce the best audio signal. In these examples, the audio signals from the microphones of the identified user device and the microphone of the conference room device may be combined for output to the conference.

Figure 8A:
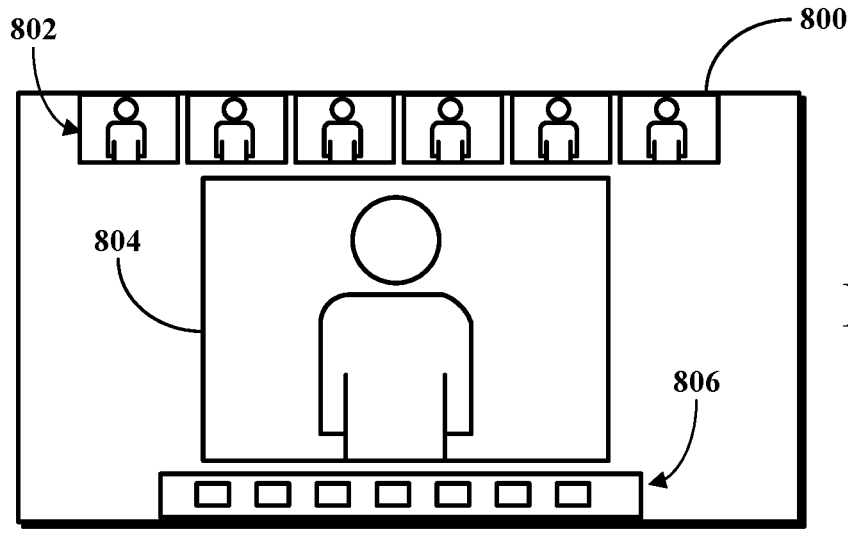
FIGS. 8A-B are illustrations of examples of user interfaces (UIs) output for display for in-person conference audio capture device selection.
Figure 8B:
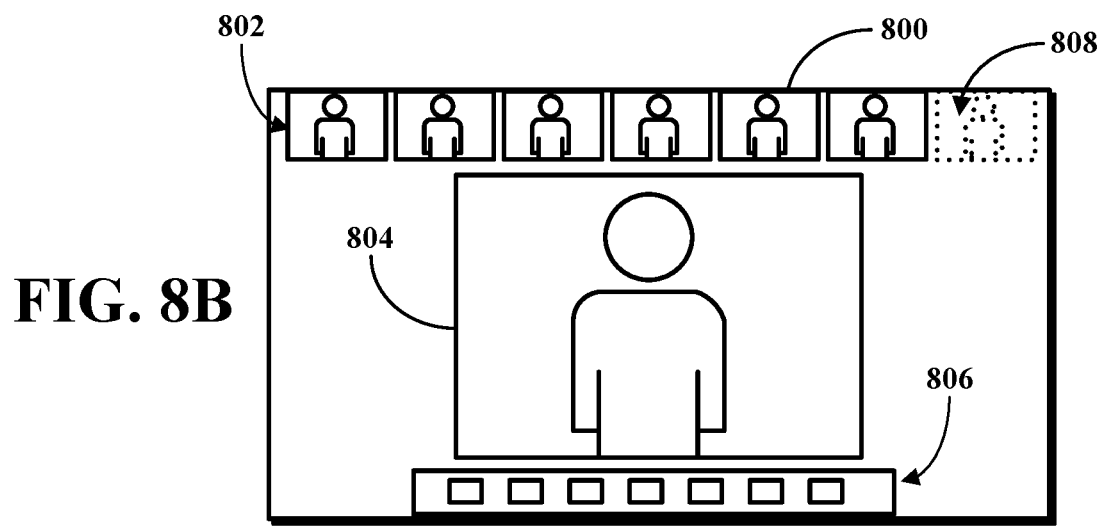

FIGS. 8A-B are illustrations of examples of UIs output for display in a conference for audio capture device selection. FIG. 8A shows a UI 800 for a conference that includes multiple UI tiles 802 for various conference participants, a main speaker UI tile 804 for a conference participant who is actively speaking, and controls 806. In this example, the main speaker UI tile 804 may be a single UI tile used to represent all of the video and audio of the participants in the conference room. It is noted that the single UI tile used to represent all of the video and audio of the participants in the conference room can be represented as one of the UI tiles 802. Referring next to FIG. 8B, in a typical conferencing system, when a user that is attending a conference in person in a conference room and joins the conference with a user device, a UI tile 808 representing the user of the user device is displayed in the conference even though the user is already represented by the UI tile for the conference room. Accordingly, the user would be represented in a single conference room UI tile, such as the main speaker UI tile 804 in this example, and the UI tile 808. If the user has multiple user devices located within the conference room, each user device would be represented as an individual UI tile in a typical conferencing system. This can lead to unnecessary clutter in the UI output 800. In the implementations disclosed herein, individual tiles for user devices, such as UI tile 808, that are located within the conference room are not displayed in the conference. Accordingly, when user devices are located within the conference room and available for audio capture for output to the conference, the UI output 800 shown in FIG. 8A would be displayed such that user devices located within the conference room are not shown as individual UI tiles.

Disclosed herein are, inter alia, implementations of systems and techniques for device management, for example, by configuring any device such as a telephony device or a video device to operate on a virtual meeting room platform.

One aspect of this disclosure is a method for audio capture in a conference. The method includes capturing first audio using a microphone of a first device located within a conference room. The method includes determining that permission to access a microphone of a second device located in the conference room has been granted. The method includes sampling audio signals from the first device and the second device. The method includes determining a first quality score (QS) for the sampled audio signals from the first device and a second QS for the sampled audio signals from the second device. The method includes capturing second audio using the microphone of the second device based on the first QS being less than the second QS.

Another aspect of this disclosure is a system for audio capture in a conference. The system includes a memory and a processor. The processor is configured to execute instructions stored in the memory. The processor is configured to capture first audio using a microphone of a first device located within a conference room. The processor is configured to determine that permission to access a microphone of a second device located in the conference room has been granted. The processor is configured to sample audio signals from the first device and the second device. The processor is configured to determine a first QS for the sampled audio signals from the first device and a second QS for the sampled audio signals from the second device. The processor is configured to capture second audio using the microphone of the second device based on the first QS being less than the second QS.

Another aspect of this disclosure includes a non-transitory computer-readable medium storing instructions operable to cause one or more processors to perform operations. The operations include capturing first audio using a microphone of a first device located within a conference room. The operations include determining that permission to access a microphone of a second device located in the conference room has been granted. The operations include sampling audio signals from the first device and the second device. The operations include determining a first QS for the sampled audio signals from the first device and a second QS for the audio signals from the second device. The operations include capturing second audio using the microphone of the second device based on the first QS being less than the second QS.

In one or more aspects, the permission to access the microphone of the second device is granted prior to a start of the conference or subsequent to the start of the conference. One or more aspects includes comparing the first QS to a threshold and sampling the audio signals from the second device based on the first QS being below the threshold. One or more aspects includes determining that the second device is within the conference room based on calendar data associated with a user of the second device and based on a determination that the second device has moved within a predetermined time of a start time of the conference. One or more aspects includes determining that the second device is within the conference room based on calendar data associated with a user of the second device and based on geolocation data of the second device at a start time of the conference. One or more aspects includes performing keyword detection to determine a keyword or phrase that indicates that the captured audio from the microphone of the first device is of low quality, and capturing of the second audio via the second device is based on the keyword detection. One or more aspects includes that the first audio and the second audio are captured simultaneously and combined to form a combined audio signal.

In one or more aspects, a processor is configured to compare the first QS to a threshold and sample the audio signals from the second device based on the first QS being below the threshold. In one or more aspects, the processor is configured to determine that the second device is within the conference room based on calendar data associated with a user of the second device and based on a determination that the second device has moved within a predetermined time of a start time of the conference. In one or more aspects, the processor is configured to determine that the second device is within the conference room based on calendar data associated with a user of the second device and based on geolocation data of the second device at a start time of the conference. In one or more aspects, the processor is configured to perform keyword detection to determine a keyword or phrase that indicates that the captured audio from the microphone of the first device is of low quality, wherein the capturing of the second audio via the second device is based on the keyword detection. In one or more aspects, the processor is configured to capture the first audio and the second audio simultaneously and combine the first audio and the second audio to form a combined audio signal.

In one or more aspects, one or more processors are configured to perform operations including comparing the first QS to a threshold and sampling the audio signals from the second device based on the first QS being below the threshold. In one or more aspects, one or more processors are configured to perform operations including determining that the second device is within the conference room based on calendar data associated with a user of the second device and that the second device has moved within a predetermined time of a start time of the conference. In one or more aspects, one or more processors are configured to perform operations including determining that the second device is within the conference room based on calendar data associated with a user of the second device and based on geolocation data of the second device at a start time of the conference. In one or more aspects, one or more processors are configured to perform operations including performing keyword detection to determine a keyword or phrase that indicates that the captured audio from the microphone of the first device is of low quality, wherein the capturing of the second audio via the second device is based on the keyword detection.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for audio capture in a conference, the method comprising:
    capturing first audio of a single user using a microphone of a first device associated with the single user and second audio of the single user using a microphone of a second device associated with the single user, the first device and the second device located within a conference room;
    determining that permission to access the microphone of the second device located in the conference room has been granted;
    sampling audio signals from the first device and the second device;
    determining a first quality score (QS) for the sampled audio signals from the first device and a second QS for the sampled audio signals from the second device; and
    outputting the second audio to the conference based on the first QS being less than the second QS.

2. The method of claim 1, wherein the permission to access the microphone of the second device is granted prior to a start of the conference or subsequent to the start of the conference.

3. The method of claim 1, further comprising:
    determining that the second device is within the conference room based on calendar data of the single user.

4. The method of claim 1, further comprising:
    determining that the second device is within the conference room based on calendar data associated with the single user and based on a determination that the second device has moved within a predetermined time of a start time of the conference.

5. The method of claim 1, further comprising:
    determining that the second device is within the conference room based on calendar data associated with the single user and based on geolocation data of the second device at a start time of the conference.

6. The method of claim 1, further comprising:
    performing keyword detection to determine a keyword or phrase that indicates that the captured audio from the microphone of the first device is of low quality, wherein the capturing of the second audio via the second device is based on the keyword detection.

7. The method of claim 1, wherein the first audio and the second audio are captured simultaneously and combined to form a combined audio signal.

8. A system for audio capture in a conference, the system comprising:
    a memory; and
    a processor configured to execute instructions stored in the memory to:
        capture first audio of a single user using a microphone of a first device associated with the single user and second audio of the single user using a microphone of a second device associated with the single user, the first device and the second device located within a conference room;
        determine that permission to access the microphone of the second device located in the conference room has been granted;
        sample audio signals from the first device and the second device;
        determine a first quality score (QS) for the sampled audio signals from the first device and a second QS for the sampled audio signals from the second device; and
        output the second audio to the conference based on the first QS being less than the second QS.

9. The system of claim 8, wherein the permission to access the microphone of the second device is granted prior to a start of the conference or subsequent to the start of the conference.

10. The system of claim 8, wherein the processor is configured to:
    determine that the second device is within the conference room based on location information.

11. The system of claim 8, wherein the processor is configured to determine that the second device is within the conference room based on calendar data associated with the single user and based on a determination that the second device has moved within a predetermined time of a start time of the conference.

12. The system of claim 8, wherein the processor is configured to determine that the second device is within the conference room based on calendar data associated with the single user and based on geolocation data of the second device at a start time of the conference.

13. The system of claim 8, wherein the processor is configured to:
    perform keyword detection to determine a keyword or phrase that indicates that the captured audio from the microphone of the first device is of low quality, wherein the capturing of the second audio via the second device is based on the keyword detection.

14. The system of claim 8, wherein the processor is configured to:
    capture the first audio and the second audio simultaneously; and
    combine the first audio and the second audio to form a combined audio signal.

15. A non-transitory computer-readable medium storing instructions operable to cause one or more processors to perform operations comprising:
    capturing first audio of a single user using a microphone of a first device associated with the single user and second audio of the single user using a microphone of a second device associated with the single user, the first device and the second device located within a conference room;

determining that permission to access the microphone of the second device located in the conference room has been granted;

sampling audio signals from the first device and the second device;

determining a first quality score (QS) for the sampled audio signals from the first device and a second QS for the sampled audio signals from the second device; and outputting the second audio to the conference based on the first QS being less than the second QS.

16. The non-transitory computer-readable medium of claim 15, wherein the permission to access the microphone of the second device is granted prior to a start of the conference or subsequent to the start of the conference.

17. The non-transitory computer-readable medium of claim 15, wherein the instructions cause the one or more processors to perform operations comprising:

determining that the second device is within the conference room based on movement information.

18. The non-transitory computer-readable medium of claim 15, wherein the instructions cause the one or more processors to perform operations comprising:

determining that the second device is within the conference room based on calendar data associated with the single user and that the second device has moved within a predetermined time of a start time of the conference.

19. The non-transitory computer-readable medium of claim 15, wherein the instructions cause the one or more processors to perform operations comprising:

determining that the second device is within the conference room based on calendar data associated with the single user and based on geolocation data of the second device at a start time of the conference.

20. The non-transitory computer-readable medium of claim 15, wherein the instructions cause the one or more processors to perform operations comprising:

performing keyword detection to determine a keyword or phrase that indicates that the captured audio from the microphone of the first device is of low quality, wherein the capturing of the second audio via the second device is based on the keyword detection.

* * * * *